US008606042B2

(12) United States Patent
Yadav et al.

(10) Patent No.: US 8,606,042 B2
(45) Date of Patent: Dec. 10, 2013

(54) BLENDING OF EXPOSURE-BRACKETED IMAGES USING WEIGHT DISTRIBUTION FUNCTIONS

(75) Inventors: Vikas Yadav, Noida (IN); Alok Kumar Singh, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 931 days.

(21) Appl. No.: 12/713,258

(22) Filed: Feb. 26, 2010

(65) Prior Publication Data

US 2013/0114894 A1    May 9, 2013

(51) Int. Cl.
*G06K 9/36* (2006.01)
(52) U.S. Cl.
USPC .......................... 382/284; 382/167; 382/274
(58) Field of Classification Search
USPC ......................................................... 382/284
See application file for complete search history.

(56) References Cited

U.S. PATENT DOCUMENTS

| | | | |
|---|---|---|---|
| 5,828,793 A * | 10/1998 | Mann | 382/284 |
| 6,781,591 B2 * | 8/2004 | Raskar | 345/582 |
| 6,868,179 B2 | 3/2005 | Gruzdev et al. | |
| 7,239,805 B2 * | 7/2007 | Uyttendaele et al. | 396/222 |
| 7,602,406 B2 | 10/2009 | Gray, III et al. | |
| 7,623,683 B2 * | 11/2009 | Chen et al. | 382/107 |
| 7,646,400 B2 * | 1/2010 | Liow et al. | 348/36 |
| 7,680,359 B2 * | 3/2010 | Castorina et al. | 382/284 |
| 7,844,133 B2 | 11/2010 | Spence et al. | |
| 2003/0043390 A1 * | 3/2003 | Fritz et al. | 358/1.9 |
| 2004/0013298 A1 | 1/2004 | Choe et al. | |
| 2004/0071363 A1 * | 4/2004 | Kouri et al. | 382/276 |
| 2005/0074179 A1 | 4/2005 | Wilensky | |
| 2005/0219264 A1 * | 10/2005 | Shum et al. | 345/629 |
| 2006/0109284 A1 * | 5/2006 | Hsieh et al. | 345/639 |
| 2006/0177150 A1 * | 8/2006 | Uyttendaele et al. | 382/284 |
| 2006/0239579 A1 | 10/2006 | Ritter | |
| 2006/0262363 A1 | 11/2006 | Henley | |
| 2007/0071341 A1 * | 3/2007 | Pfister | 382/254 |
| 2007/0103483 A1 * | 5/2007 | Glen | 345/592 |
| 2008/0297596 A1 * | 12/2008 | Inomata et al. | 348/80 |
| 2013/0094758 A1 * | 4/2013 | Yadav | 382/167 |
| 2013/0114894 A1 * | 5/2013 | Yadav et al. | 382/167 |

OTHER PUBLICATIONS

Mertens et al., "Exposure Fusion: A Simple and Practical Alternative to High Dynamic Range Photography", Computer Graphics, 2009, vol. 28, No. 1, pp. 161-171.*
Gradient domain Image Blending—Devices, Xiong et al., IFCS-SITE, 2010, pp. 293-306.
David W. Viljoen, et al., "Saturation and Value Modulation (SVM): A New Method for Integrating Color and Grayscale Imagery," 2007, 14 pages.

* cited by examiner

*Primary Examiner* — Gandhi Thirugnanam
(74) *Attorney, Agent, or Firm* — Finch & Maloney PLLC

(57) ABSTRACT

Systems and methods are presented for generating a new digital output image by blending a plurality of digital input images capturing the same scene at different levels of exposure. Each new pixel for the new digital output image is derived from a group of corresponding aligned pixels from the digital input images. In order to determine a weight for each pixel in each group of mutually-aligned source-image pixels, a weight distribution function is applied to values of an image characteristic for the pixels in the group of corresponding aligned pixels, and a net weight is subsequently assigned to each of the pixels in the group. Pixel values of pixels in each group of mutually-aligned source-image pixels are modified based on the net weights assigned to the pixels in order to obtain a new pixel value for a corresponding new pixel in the new digital output image.

19 Claims, 7 Drawing Sheets

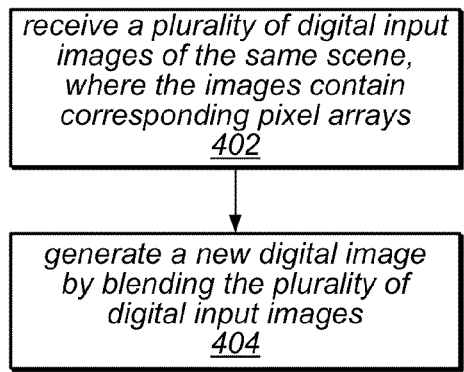
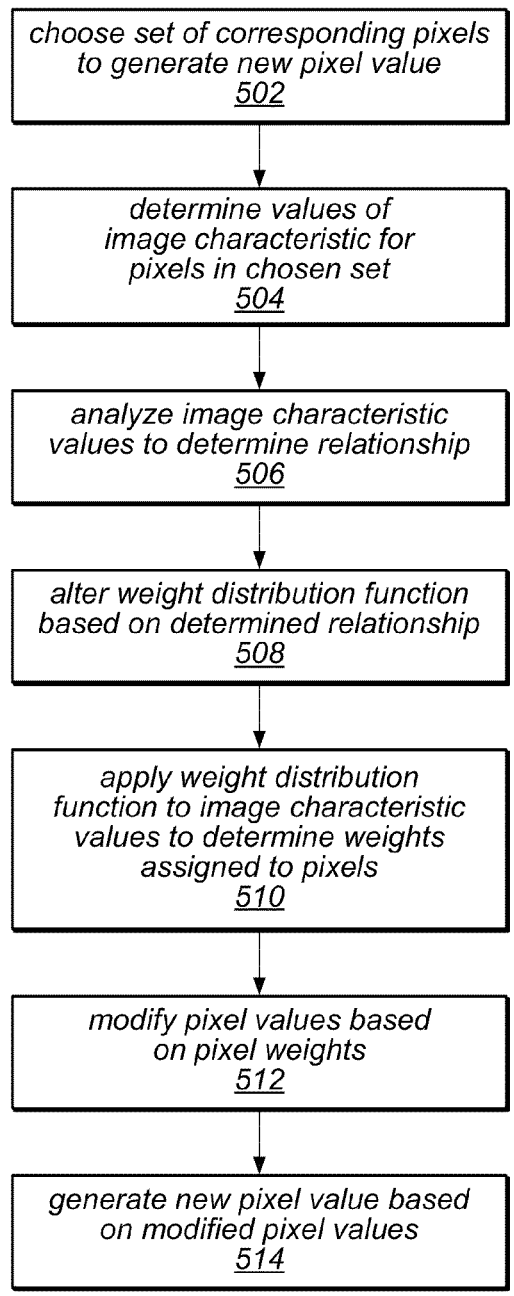

BLENDING OF EXPOSURE-BRACKETED IMAGES USING WEIGHT DISTRIBUTION FUNCTIONS

BACKGROUND

Photographic and image processing methods sometimes involve capturing multiple images of the same scene at varying levels of exposure, a technique known as exposure bracketing. High-contrast scenes can cause problems for cameras, which may not be capable of capturing as wide a dynamic range of light and dark within a scene as the human eye is able to perceive. A single camera image taken at a middle exposure might record a scene with bright regions appearing nearly white, or dark regions nearly black. By taking a series of images of the same scene across a range of exposure levels, a camera can correctly capture bright parts of the scene in some of the images, and dark parts in others of the images. Computerized digital imagery functions can extract information contained within the series of images, analyze the extracted information, and then manipulate the data held in the entire series of images to produce a new image that captures the original scene in fuller dynamic range than any of the original individual photographs. The resulting new image is a blended exposure gotten by merging some or all of the original photographs.

Current methods for managing and blending exposure-bracketing images of a scene can be slow, computationally expensive, complex, or ill-suited for non-professional equipment. For example, some high dynamic range (HDR) techniques may require using many bits per color channel, and thus may make large memory and processing demands. Algorithms for manipulating HDR data may be complex, and consequently computationally expensive. Workflows for executing such methods may be complicated enough to discourage non-professionals from using them. In some cases, current methods necessitate use of expensive, specialized monitors.

SUMMARY

The description herein discloses various embodiments of systems and methods for receiving and blending a plurality of digital input images of a same scene, where the digital input images comprise corresponding pixel arrays. The pixels within the several arrays may correspond geometrically with respect to the particular part of the single scene that each corresponding pixel represents. A new digital image is created by blending the received digital input images. The new digital image may be derived on a pixel-by-pixel basis, and generation of a new pixel for the new digital image may involve selecting a set of corresponding, coincident pixels by choosing one pixel from each of the digital input images such that each pixel in the selected set coincides with all the other pixels in the selected set. Each such set of corresponding pixels from the corresponding pixel arrays may then be processed to derive a new pixel value for the new pixel in the new digital image. For each given set of corresponding pixels chosen from the corresponding pixel arrays, a weight may be assigned to each pixel in the set of corresponding pixels via a weight distribution function. Assigning the weight to each pixel in the set of corresponding pixels via the weight distribution function may, according to certain embodiments, include analyzing values of an image characteristic for the pixels in the set of corresponding pixels to determine a relationship among the values of the image characteristic, subsequently altering the weight distribution function, based on the determined relationship, and then applying the altered weight distribution function to the value of the image characteristic for each pixel in the set of corresponding pixels in order to determine the weight assigned to the pixel.

Assigning the weight to each pixel in the set of corresponding pixels via the weight distribution function may, according to various embodiments, include determining values of an image characteristic for the pixels in the set of corresponding pixels and applying the weight distribution function to the value of the image characteristic for each pixel in the set of corresponding pixels to determine the weight assigned to the pixel, wherein, for at least several of the sets of corresponding pixels, the weight distribution function is altered before the applying of the weight distribution function. In some instances, for each individual set of the several sets of corresponding pixels, the weight distribution function is altered before it is applied, based on a relationship among the values of the image characteristic for the pixels in the individual set of corresponding pixels.

Deriving the new pixel value for the new pixel in the new digital image is based on modifying the pixel value for each pixel in the set of corresponding pixels, depending on the weight assigned to the pixel.

The image characteristic for the pixels in the set of corresponding pixels may be variously embodied as pixel luminance, color saturation, contrast, sharpness, or as other measures of qualities inherent in the digital input images, in the scene being photographed, or in the apparatus which captures the digital images of the scene.

The weight distribution function that is engaged to assign the weights to the pixels in the numerous sets of corresponding pixels selected from the corresponding pixel arrays of the digital input images may be variously embodied. For example, it may be realized as a probability density function, such as a Gaussian function, or some other kind of density function, or as a piecewise linear function.

Weights may be assigned to pixels belonging to numerous sets of corresponding pixels selected from the corresponding pixel arrays of the digital input images, and the assignment of the weights may depend upon a particular image characteristic that measures a quality inherent in the digital input images, and upon values of that particular image characteristic for the pixels in the numerous sets of corresponding pixels. The assignment of the weights may depend, in some embodiments, upon measures of qualities that are inherent in the scene being photographed, or that are inherent in the apparatus which captures the digital images of the scene. According to some embodiments, altering the weight distribution function specifically for a given set of corresponding pixels from the corresponding pixel arrays of the digital input images may involve translating the weight distribution function, based on a difference between a median of and a mean of the values of the particular image characteristic for the pixels in the given set of corresponding pixels. In some situations, the translating shifts the weight distribution function in a direction from the mean toward the median, based on the difference between the median and the mean, and this shifting may, in certain contexts, depend on comparing the number of pixels in the given set whose characteristic value is on the median side of the mean with the number of pixels in the given set whose characteristic value is on the non-median side of the mean.

For embodiments in which weights to be assigned to pixels in several sets of corresponding pixels depend upon a particular color saturation characteristic, color saturation weights may be chosen so that none of them is zero.

According to some embodiments, modifying the pixel value for each pixel in a set of corresponding pixels depends on a multiplicity of weights assigned to each of the pixels in the set.

According to numerous embodiments, modifying the pixel value for each pixel in a set of corresponding pixels includes, for each pixel in the set of corresponding pixels, computing a product of the pixel value for the pixel with the weight assigned to the pixel, and the deriving of the new pixel value is based on subsequently summing the computed products.

For certain embodiments, altering the weight distribution function may include translating the weight distribution function along an axis or changing a shape of the weight distribution function, receiving user input to control an extent of the translating or the changing the shape, and performing the translating or the changing the shape based on the received user input.

In various embodiments, a memory is coupled to a processor, and the memory stores program instructions executable by the processor to implement an image blending module. In these embodiments, the functions described above may be performed by the image blending module. In some embodiments, the system may include a computer-readable storage medium storing program instructions that are computer-executable to perform these functions.

BRIEF DESCRIPTION OF THE DRAWINGS

FIG. 4 is a flow diagram illustrating an embodiment for blending of the multiple digital input images, including receiving multiple digital input images of the same scene, and in response, generating a new digital image.

FIG. 5 is a flow diagram illustrating one embodiment of a pixel-by-pixel blending technique.

Figure 1:
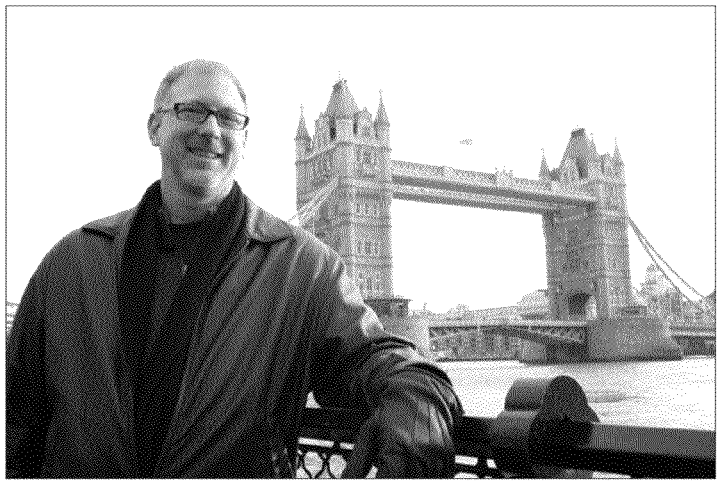
FIGS. 1-3 illustrate one embodiment of digital input images of the same scene, where the digital input images were captured at varying levels of exposure.

While the present disclosure is described herein by way of example for several embodiments and illustrative drawings, those skilled in the art will recognize that the disclosure is not limited to the embodiments or drawings described. It should be understood, that the drawings and detailed description thereto are not intended to limit the claims to the particular form disclosed, but that on the contrary, the intention is to cover modifications, equivalents and alternatives falling within the spirit and scope of the present disclosure as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the following detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is understood that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction

The following discussion explores various embodiments of systems and methods for processing a series of digital images of a single scene. The methods present a user interface that may permit variable selection of several or all of the images in a collection of digital images of a single scene. The user interface may allow a user to independently vary certain image quality parameters used in blending the selected digital images to produce a new digital image. In response to selection of several or all of the images in the collection of digital images of the single scene, and to user input controlling various image quality parameters, the selected images may be automatically and immediately blended to create a new digital image, without requiring further user intervention. The user may be presented with an immediate display of the newly created image, also without user intervention. The user may then deselect some previously selected images, or select from the collection some images that are currently not selected, or may adjust previously-set image quality parameters, and again see an automatic and immediate display of a new digital image generated by blending the newly-selected images according to the image quality parameters set by the user.

The following paragraphs describe techniques for blending a series of digital input images of a single scene to obtain a new digital image that may capture the single scene in fuller dynamic range than any of the original individual digital images. The flexible algorithms described herein constrain the degree of participation by each of the pixels in a particular set of corresponding pixels from the original input images, where the pixels in the particular set are used to jointly generate the new pixel value. Each pixel in the particular set of corresponding pixels may be assigned a numerical weight, such that each pixel in the particular set of corresponding pixels participates in generating the new pixel value in proportion to the pixel's assigned numerical weight, and such that each of the individual participating pixels makes its own appropriate level of contribution in generating an optimal new pixel value for the new pixel. Taken together, the contributions made by each of the individual participating pixels yield an optimal pixel value for the new pixel.

Blending Digital Input Images Using Weight Distribution Functions

Figure 2:
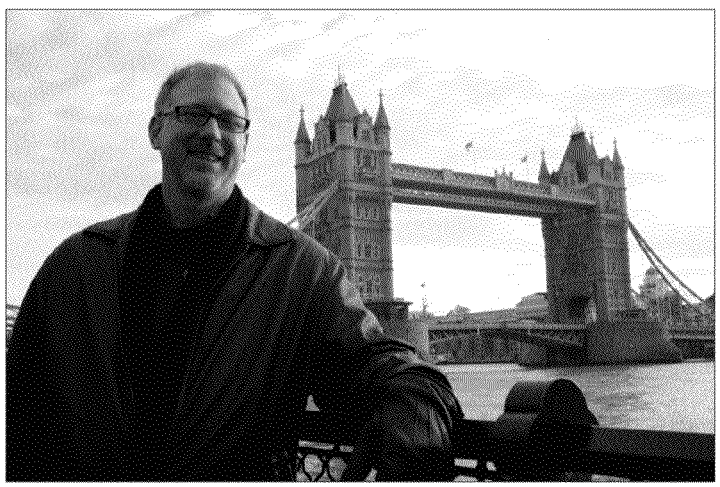
Figure 3:

Each of several differently-exposed digital images of a single scene may comprise a pixel array, and pixels from those pixel arrays may be grouped into tuples that each contain a single pixel from each of the pixel arrays, such that each pixel in any given tuple represents the same geometric portion of the single scene. In other words, when the several differently-exposed digital images of the single scene are geometrically aligned, they yield groups or tuples of mutually-aligned pixels. Each such group of mutually-aligned pixels may be described as a set of corresponding pixels from corresponding pixel arrays of the digital input images. A single pixel in one of the pixel arrays may have a particular color value, while its corresponding single pixel from each of the other pixel arrays may have its own color value, which may or may not be the same as the particular color value, depending on the exposure levels at which the digital images were taken. For example, FIGS. 1-3 show three different images of a single scene, each taken at a different exposure setting. The three exposure-bracketing images capture three sets of visual information about the single scene, and each of the three exposure-bracketing images stores its own captured set of visual information about the single scene in its own pixel array. In this embodiment, the three pixel arrays may coincide exactly, so that each pixel in one of the pixel arrays corresponds to exactly one pixel in each of the other two pixel arrays, thus yielding numerous 3-tuples of aligned pixels. In other embodiments, the pixel arrays for the several differently-exposed digital images of a single scene may only partially coincide. For example, if the camera moves slightly between takes of the several digital images, then there may be only a subarray of each of the original pixel arrays for the several differently-exposed digital images such that all the individual pixel subarrays of the original pixel arrays mutually coincide, pixel-for-pixel. For some embodiments in which the pixel arrays for the several differently-exposed digital images of a single scene only partially coincide, the systems and methods described below may operate only on the pixels that belong to the coincident, corresponding subarrays. The term array as used herein is broadly construed to include one-dimensional vectors or tuples, 2-dimensional grids or matrices, tables, lists, search trees, or any other data structures used to store pixel data for the digital input images.

The flow diagram in FIG. 4 illustrates two main stages for weighted blending of the multiple digital input images, according to various embodiments. In these embodiments, an image blending module of a computing system (FIG. 10, element 1025) may, at the first stage, receive a plurality of digital input images of the same scene (FIG. 4, 402). As described in the introductory paragraphs above, the received digital input images may have been captured at different exposure settings, so that they represent the same scene taken a varying levels of exposure. The received digital input images may be part of a collection of many images taken of a single scene in order to form an exposure-bracketing set. The information contained collectively within the entire set of exposure-bracketing digital images may be extracted and analyzed, and then manipulated by an image-blending mechanism, such as image blending module 1025 in FIG. 10, to produce a new digital image that captures the original scene in fuller dynamic range than does any individual one of the multiple digital input images.

The second main stage illustrated in FIG. 4 is for generating a new digital image by means of weighted blending of a selected multiplicity of the received digital input images (FIG. 4, 404), a process that may operate on a pixel-by-pixel basis. Weights used in the process generating a new pixel color value for a pixel in the new digital image may be calculated independently from weights used in the process of generating another new pixel color value for a different pixel in the new digital image. For example, a new digital image may be formed by blending all three of the images shown in FIGS. 1-3, where each of the images was taken at a different exposure level. Each of the three exposure-bracketing images shown in FIGS. 1-3 stores its own captured set of visual information about the same scene in its own pixel array. The three pixel arrays are mutually coincident, and thus form a complete set of pixel triplets, or 3-tuples. The pixels within each triplet may correspond to each other because they are mutually aligned when the three images are aligned. Each one of them may correspond to the same geometric portion of the scene captured by the three digital images. If, for instance, each of the three coincident pixel arrays contains 10 megapixels, then there are 10 million triplets of corresponding pixels from which to generate the new digital image, and each of the 10 million pixel triplets may be individually processed to generate a corresponding single pixel for the new digital image. According to some embodiments, each one of the million pixel triplets may be used by itself, without reference to the other pixel triplets, to generate a value for the new pixel in the new digital image that will correspond to that one pixel triplet. For a given pixel triplet, the determining of weights assigned to each of the three pixels, where the weights are used in deriving a new pixel value for a corresponding new pixel in the new digital image, may be different from the determining of weights assigned to pixels in other pixel triplets. Weighted blending may thus be individually tailored for each one of the derived new pixels, independent of the other derived new pixels. According to other embodiments, the determining of weights assigned to pixels in one group of pixel triplets, and used in deriving new pixel values for a corresponding group of new pixels in the new digital image, may be different from the determining of weights assigned to pixels in other groups of pixel triplets.

FIG. 5 illustrates stages of a weighted blending procedure for generating a pixel value for a new pixel of the new digital image, according to various embodiments. The weighted blending procedure may operate on a pixel-by-pixel basis to generate pixel values for the other new pixels of the new digital image.

According to various embodiments, the process of generating a new pixel value for a new pixel of the new digital image may begin with choosing a set of corresponding pixels from the corresponding pixel arrays (FIG. 5, 502), that is, with choosing a set of pixels, one from each of the digital input images, such that the pixels are mutually aligned so as to correspond to the same geometric point of the same scene. As a member pixel of a particular one of the digital input images, each pixel in the chosen set of corresponding pixels possesses a pixel value given to it by the particular digital input image to which it belongs. The pixels in the chosen set of corresponding pixels induce a new pixel of the new digital image. The pixel value for this new pixel of the new digital image is gotten by manipulating the pixel values for the pixels in the chosen set of corresponding pixels. Pixel values for pixels in the digital input images and in the new digital image may be expressed in various forms, according to various embodiments. For example, the pixel values may be embodied as color values from an additive color space that includes separate color channels, such any of several standard red-green-blue (RGB) additive color spaces. Color values for points in some embodiments of RGB additive color spaces may be conveyed as 3-tuples of the form (r,g,b), where r represents a color coordinate for the red color channel, g represents a color coordinate for the green color channel, and b represents a color coordinate for the blue color channel. In other embodiments, pixel values may embodied as color values from an HSV (Hue, Saturation, Value) or HSL (Hue, Saturation, Lightness) color space in which the middle component represents a degree of color saturation. Color values for points in some embodiments of HSV or HSL spaces may be expressed as 3-tuples of the form (h,s,v) or (h,s,l), where h represents a hue coordinate, s represents a saturation coordinate, v represents a value coordinate, and l represents a lightness coordinate. Pixels in the digital input images and pixels in the new digital image may possess pixel values expressed in yet other forms, including those found in any of a variety of color spaces, such as RGBA (red-green-blue-alpha), CMYK (cyan-magenta-yellow-key), or in any other presently-known color space.

When a set of corresponding pixels from the corresponding pixel arrays has been chosen to generate a new pixel and the new pixel's value in the new digital image (FIG. 5, 502), then one or more image characteristic values may be assessed for each of the pixels in the chosen set (FIG. 5, 504). For example, diverse embodiments may designate image characteristics like luminance, color saturation, contrast, sharpness, or other image properties, and may require calculating a value of each of the designated image characteristics for each individual pixel in the chosen set of corresponding pixels. Some embodiments may designate just one single image characteristic, and may only require calculation of a value of that one single image characteristic for each of the pixels in the chosen set of corresponding pixels. Values of some image characteristics, such as luminance and color saturation, may be derived for a given pixel of a given input image using that pixel's value in the given input image, without reference to the pixel values for other pixels in the given input image. On the other hand, the values of certain image characteristics, such as local contrast and local sharpness, may depend not only on the pixel value of the given pixel of a given input image, but also on the pixel values of neighboring pixels in the given input image. Luminance values for pixels in an input image may be derived using various techniques and formulae. For example, for some cases in which pixel values for pixels in an input image are expressed as (r,g,b) triplets from an RGB additive color space, luminance may be expressed as 0.59G+0.30R+0.11B, where G is the color coordinate for the green color channel, R is the color coordinate for the red color channel, and B is the color coordinate for the blue color channel. Values for other image characteristics may be obtained using any of the known methods for deriving them.

A separate weight distribution function may be established for each one of the designated image characteristics described above, according to numerous embodiments. A particular weight distribution function paired with a particular designated image characteristic may then be applied in the process of blending the digital input images to derive new pixel values for the new pixels of the new digital image. In order to derive a new pixel value for a new pixel derived from a chosen set of corresponding pixels from the digital input images, and specifically to assign weights to each of the pixels in the chosen set of corresponding pixels (FIG. 5, 510), the particular weight distribution function may be applied to the values of the designated image characteristic for the pixels in the chosen set. For example, in some instances, a designated luminance characteristic may be paired with a weight distribution function in the form of a bell curve, and the bell curve may then be applied, perhaps in adapted, customized, or otherwise altered form, to the luminance values obtained for the pixels in the chosen set. Applying the bell curve to the luminance values yields a numerical weight for each of the pixels in the chosen set of pixels, and the weights themselves may be used in determining the new pixel value for the new pixel generated from the chosen set of corresponding pixels from the digital input images.

The weight distribution function that is paired with a designated image characteristic may be embodied in numerous forms. For instance, the weight distribution function may be embodied as a probability density function, or as some other function that is based on a distribution of the values of the designated image characteristic for pixels in a chosen set of corresponding pixels. Such a distribution may be a binomial distribution, beta distribution, Cauchy distribution, gamma distribution, Gumbel distribution, log-normal distribution, normal distribution (whose associated probability density function is the Gaussian function, or bell curve), Poisson distribution, Rayleigh distribution, or any other sort of distribution representing some dispersion of data. The weight distribution function may also be embodied as some other type of function, such as a linear function, or as a piecewise linear function, that is not necessarily based on a distribution density of the values of a designated image characteristic. For example, in calculating pixel weights based on color saturation values for pixels in a chosen set of corresponding pixels, an affine linear function may be applied to the pixels' color saturation values to generate pixel weights which are always positive, always less than or equal to one (or other appropriate constant), and directly proportional to the magnitude of the pixels' color saturation values.

Each designated image characteristic may give rise to corresponding weight maps, yielding one weight map per digital input image. For example, a separate luminance weight map may be generated for each one of the digital input images. The luminance weight map value for a given pixel $p_I$ of a digital input image I may be obtained by collecting into a set, together with $p_I$, the pixels in all the other digital input images that align with the pixel $p_I$. A luminance weight distribution function already paired with the luminance characteristic may then be specially adapted, customized, or tuned to the particular luminance values of that collected set of pixels, and subsequently applied to those same luminance values in order to generate a corresponding luminance weight for each pixel in the collected set of pixels. In this manner, a luminance weight $W_{L,I}(p_I)$ for the pixel $p_I$ is produced, where $W_{L,I}$ denotes the luminance weight map for the digital input image I. For those embodiments that stipulate luminance, color saturation, and local contrast as the three designated image characteristics, then three corresponding weight maps, $W_{L,I}$, $W_{S,I}$, and $W_{C,I}$ may be generated for each of the digital input images I.

Some embodiments may require that image characteristic weight maps for the digital input images be explicitly generated and optionally stored in corresponding explicit data structures. For some other embodiments, an image characteristic weight map for a digital input image may exist only as an implicit structure which has the potential to be explicitly assembled, using weights that are derived for the pixels in the digital input image while performing other calculations.

For embodiments that designate multiple image characteristics, pixels from the digital input images may have multiple corresponding weights assigned to them through application of the weight distribution functions that are paired with the multiple image characteristics. Accordingly, each digital input image may have multiple weight maps, one for each of the designated image characteristics. The multiple weight maps of any particular digital input image may be combined into one single composite weight map. According to some embodiments, the several weights assigned by several distinct weight maps to a particular pixel of a particular digital input image may be combined using multiplication, or another mathematical combining operation, to produce a new net weight that is the product or result of merging the several individual weights assigned to the particular pixel by the several distinct weight maps. In this manner, several weight maps may be merged or combined to generate a single composite weight map. For those embodiments which designate only a single image characteristic, and thus give rise to only a single weight map per digital input image, the single weight map may play a similar or identical role in later calculations to the role played by a composite weight map for embodiments designating multiple image characteristics. The single weight map generated for embodiments designating only a single image characteristic, and the composite weight map generated for embodiments designating multiple image characteristics, may both be considered as a merged, net, terminal, or final weight map for its corresponding digital input image.

Once a net weight map has been either explicitly or implicitly created for each of the digital input images, new pixel values may be generated for the new pixels in the new digital image (FIG. 5, 512-514), according to various embodiments. Some embodiments may generate a new pixel value for a new pixel in the new digital image without waiting for the generation of a completed net weight map for each of the digital input images. These embodiments may instead derive a net weight for each individual pixel in just a particular set of pixels that are selected from the corresponding pixel arrays of the digital input images, where the pixels are selected because they are mutually aligned, and all correspond to the same geometric point of the same scene, and thus comprise the appropriate collection of source-image pixels for generating a new pixel in the new digital image to represent the same geometric point of the same scene. In either case, operations on a set of mutually-aligned source-image pixels may generate a new pixel value for a corresponding new pixel in the new digital image by modifying the value of each of the mutually-aligned source-image pixels according to its individual net weight, and by subsequently combining the resulting modified pixel values. For example, in some embodiments, if the pixel values for pixels in the digital input images are expressed as 3-tuples of the form (r,g,b), where r represents a color coordinate for the red color channel, g represents a color coordinate for the green color channel, and b represents a color coordinate for the blue color channel, and if $W_{net,I}(p_I)$ denotes the net or composite weight assigned to pixel $p_I$ in digital input image I, then $W_{net,I}(p_I)$ may be multiplied by each color-channel value for the pixel $p_I$ to modify each color-channel value for the pixel $p_I$. The modified red-channel value for pixel $p_I$ may be expressed as $W_{net,I}(p_I) \times \text{red}(p_I)$, where $\text{red}(p_I)$ denotes the red-channel value for pixel $p_I$ in digital input image I. Similarly, the modified green-channel value for pixel $p_I$ may be expressed as $W_{net,I}(p_I) \times \text{green}(p_I)$, where $\text{green}(p_I)$ denotes the green-channel value for pixel $p_I$ in digital input image I, and the modified blue-channel value for pixel $p_I$ may be expressed as $W_{net,I}(p_I) \times \text{blue}(p_I)$, where $\text{blue}(p_I)$ denotes the blue-channel value for pixel $p_I$ in digital input image I. The red-channel value for the new pixel may then be expressed as $$\sum_I W_{net,I}(p_I) \times \text{red}(p_I),$$

where the summation is taken over selected digital input images I. Similarly, the green-channel value for the new pixel may be expressed as $$\sum_I W_{net,I}(p_I) \times \text{green}(p_I),$$

and the blue-channel value for the new pixel may be expressed as $$\sum_I W_{net,I}(p_I) \times \text{blue}(p_I).$$

In this manner, a new value in RGB color space, namely the 3-tuple $$\left(\sum_I W_{net,I}(p_I) \times \text{red}(p_I), \sum_I W_{net,I}(p_I) \times \text{green}(p_I), \sum_I W_{net,I}(p_I) \times \text{blue}(p_I)\right),$$

is assigned to the new pixel derived from the set of mutually-aligned source-image pixels.

According to other embodiments, other techniques may be used to assign a value to a new pixel derived from a set of mutually-aligned source-image pixels. For example, if the values for pixels in the digital input images are expressed as points in HSV space, then the values of each of the mutually-aligned source-image pixels may be modified according to their individual net weights, and subsequently combined to obtain a value in HSV space for the new pixel.

Various implementations may pair a weight distribution function with each of one or more designated image characteristics, and may apply a weight distribution function paired with a designated image characteristic to obtain individual weights for pixels in the digital input images. For example, a pixel luminance characteristic may be paired with a luminance weight distribution function in the form of a bell curve, and the bell curve may be applied, perhaps in adapted, customized, or otherwise altered form, to the luminance values obtained for pixels in a chosen set of mutually-aligned source-image pixels. Applying the bell curve to the luminance values yields a numerical luminance weight for each of the pixels in the chosen set of mutually-aligned source-image pixels, and the luminance weights themselves may figure in determining the new pixel value for the new pixel generated from the chosen set of mutually-aligned source-image pixels. For embodiments that designate additional image characteristics that are different from pixel luminance, corresponding additional image characteristic weights may be determined for each of the pixels in the chosen set of mutually-aligned source-image pixels, and may be combined with the luminance weights to derive a net or composite weight for each of the pixels in the chosen set of mutually-aligned source-image pixels.

The luminance weight distribution function may be embodied in various forms, as described above. For example, it may be embodied as a bell curve like a Gaussian function, which is a density function for a normal distribution. Before being applied to the pixel values for a chosen set of mutually-aligned source-image pixels, the bell curve (weight distribution function) may be altered based on analyzing the luminance values of the pixels in the chosen set of mutually-aligned source-image pixels to determine a relationship among those pixels (FIG. 5, 506-508). For example, the mean value of the set of all luminance values for the pixels in the chosen set may be compared with the median value of the set of all luminance values for the pixels in the chosen set. If the mean and median values differ by a small amount, or by less than a preset threshold amount, the luminance values may be fairly uniformly distributed, with the mean luminance value representing an appropriate average, or middle ground for the entire set of luminance values for the pixels in the chosen set. In such instances, a Gaussian function, or other named luminance weight distribution function, may be centered at the mean luminance value for the pixels in the chosen set and subsequently applied to each of the luminance values. This application may associate a weight of 1 with the mean luminance value and lesser positive weights with luminance values away from the mean. The resulting weights may all lie within the interval [0,1], or within a magnified or compressed form of the interval [0,1]. Each pixel in the chosen set may then have its luminance weight assigned as the second coordinate of the point on the Gaussian function whose first coordinate is the luminance value of the pixel. In this manner, a luminance weight may be obtained for each of the pixels in the chosen set, such that pixels whose luminance values are near the mean have the largest weights, and pixels whose luminance values are far from the mean have smaller weights, in proportion to the distance of their luminance values from the mean luminance value. When the luminance weights are applied in calculating a new pixel value for the new pixel that corresponds to the pixels in the chosen set of mutually-aligned source-image pixels, the new pixel value may accurately and broadly represent the luminance information accumulated by the pixels in the chosen set. Centering the Gaussian function at the mean of the luminance values focuses attention on the portion of the luminance spectrum inhabited by the luminance values for the chosen set of pixels, and not on portions of the luminance spectrum where there are few or no luminance values for the chosen set of pixels. Thus, the new pixel value contains a full, balanced representation of the combined luminance information stored in all the pixels of the chosen set.

It is important to note that in calculating a new pixel value for a different new pixel obtained from a different chosen set of mutually-aligned source-image pixels, the luminance weight distribution function (for example, a Gaussian function) may be centered at the mean luminance value for the pixels in the different chosen set of pixels, and thus be tailored to those luminance values, and not to the luminance values for the pixels in the previous chosen set of pixels. Positioning and customizing or altering of the luminance weight distribution function may thus be performed on a pixel-by-pixel basis, with respect to the pixels of the new digital image that are derived from corresponding sets of mutually-aligned source-image pixels.

If the mean and median values differ by a significant amount, or by more than a preset threshold amount, the luminance values may not be uniformly distributed along a luminance axis or spectrum, and the mean luminance value may not represent an appropriate average, or middle ground for the entire set of luminance values for the pixels in the chosen set. In many such instances of skewed luminance value distributions, the center of the luminance weight distribution function (for example, a Gaussian function) may be translated away from the mean luminance value of the pixels in the chosen set of pixels, so that the center shifts in the direction of the median luminance value of the pixels in the chosen set. By shifting the center of the luminance weight distribution function away from the mean and towards the median, the role of outlier luminance values in determining a pixel value for a new pixel derived from the set of mutually-aligned source-image pixels may be minimized, and luminance values that are closer to the median may be given more contributing weight in calculating the pixel value for the new pixel.

According to various embodiments, a weight distribution function applied to the values of a designated image characteristic for a chosen set of mutually-aligned source-image pixels may be positioned in a variety of ways. For some embodiments, the weight distribution function may be centered halfway between the mean and the median values of the designated image characteristic for the chosen set of source-image pixels. This technique may often produce good results in blending digital input images to form a new digital output image. In other embodiments, the positioning of the center of the weight distribution function may depend on comparing the number of pixels in the chosen set whose designated image characteristic value is on the median side of the mean with the number of pixels in the chosen set whose designated image characteristic value is on the non-median side of the mean. If, for example, there are m pixels whose designated image characteristic value is on the median side of the mean, and there are n pixels whose designated image characteristic value is on the non-median side of the mean, then the weight distribution function may be centered m/m+n of the way from the mean to the median, that is, the center may be shifted away from the mean in the direction of the median in the proportion m/m+n. Centering the weight distribution function in this way may emphasize the portion of the designated image characteristic spectrum populated by the preponderance of designated image characteristic values of the pixels in the chosen set of pixels, and may deemphasize portions of the designated image characteristic spectrum where there are only outlier values, or no values of the designated image characteristic for the chosen set of pixels. Thus, a new pixel value subsequently derived according to weights assigned to the mutually-aligned source-image pixels via the weight distribution function may optimally encapsulate the combined designated image characteristic information that is collectively stored in the pixels of the chosen set.

It is important to note that the positioning of a weight distribution function relative to the values of a designated image characteristic for a chosen set of mutually-aligned source-image pixels depends on the chosen set of mutually-aligned source-image pixels. The positioning of the weight distribution function along the designated image characteristic spectrum may be entirely different for two distinct sets of mutually-aligned source-image pixels. The positioning of the weight distribution function along the designated image characteristic spectrum may be customized for each particular set of mutually-aligned source-image pixels. The positioning of the weight distribution function along the designated image characteristic spectrum may be optimized for each set of mutually-aligned source-image pixels, so that the weights derived using the custom-positioned weight distribution function may facilitate an optimal representation of the combined designated image characteristic information that is stored collectively in all the pixels of the chosen set of mutually-aligned source-image pixels.

In addition to the methods already described, various embodiments may use other algorithms in determining how to shift or alter a weight distribution function before it is applied to designated image characteristic values of a particular set of source-image pixels. Such algorithms may depend on both the type of the weight distribution function and the sort of designated image characteristic whose values are to be passed to the weight distribution function. Aside from shifting or translating a weight distribution function prior to its application to a set of image characteristic values, some embodiments may involve shaping the weight distribution function prior to its application to a set of image characteristic values. For example, a bell curve being applied to a particular set of pixel luminance values may be either stretched or compressed horizontally, depending on how the pixel luminance values are positioned or concentrated along the image characteristic spectrum. A bell curve, such as a Gaussian function, whose normal form is symmetric, may also assume an asymmetric or lopsided appearance prior to its application to pixel luminance values comprising a skewed distribution.

For some embodiments that include color saturation as a designated image characteristic, an affine linear function may be applied to pixels' color saturation values in generating color-saturation pixel weights for corresponding sets of mutually-aligned source-image pixels. Some embodiments may generate such color-saturation pixel weights in constructing, either explicitly or implicitly, color saturation weight maps for the source images. For some embodiments, the weight distribution function used to produce color-saturation pixel weights may be embodied as an affine linear function such that the color-saturation pixel weights are always positive, are always less than or equal to a set constant value, such as 1, and are directly proportional to the magnitude of the pixels' color saturation values. The slope of the affine linear function may be fixed so that higher color saturation values align with higher points on the affine linear function than lower color saturation values do, and thus the larger a pixel's color saturation value, the larger the weight that is assigned to it by the linear function. In such embodiments, a pixel belonging to a chosen set of mutually-aligned source-image pixels and having a relatively large color saturation value contributes more to the new pixel value for the new pixel derived from the chosen set than does a pixel in the chosen set whose color saturation value is relatively smaller. In addition, the affine linear function may be configured to assign a positive value to each of its non-negative arguments, so that even if a pixel is gray, and has color saturation value equal to zero, it will still receive at least a small positive color-saturation weight. Since the color-saturation weight assigned to each pixel in the set, even to a gray one, is always positive, a zero color saturation value of an individual pixel in the set will not force a composite, terminal or net weight assigned to that individual pixel to be zero. If, due to its grayness, a source-image pixel is assigned a color-saturation weight that is small, the same pixel may still be assigned some other image characteristic weight, such a pixel luminance weight, a contrast weight, or a sharpness weight, which is relatively high. Thus, when the pixel's composite or net weight is calculated using its various image characteristic weights, its low color-saturation weight may serve to diminish, but not to extinguish, the pixel's role in determining a pixel value for the new pixel derived from the set of mutually-aligned source-image pixels. This technique assures that color saturation information stored collectively in the pixels of the chosen set of mutually-aligned source-image pixels is given a balanced representation in the pixel value eventually determined for the new pixel derived from the chosen set of pixels.

Some embodiments may include contrast or sharpness among their designated image characteristics, and may assign a corresponding contrast weight distribution function and sharpness weight distribution function for generating contrast weights and sharpness weights for the pixels in the digital input images. Computation of contrast values and sharpness values of an individual pixel in a source image may involve examination of other source-image pixels in a neighborhood surrounding the individual pixel whose contrast or sharpness value is being assessed. Once a contrast or sharpness value has been determined for each pixel in a given set of mutually-aligned source-image pixels, the contrast weight distribution function and sharpness weight distribution may be customized with respect to the given set of source-image pixels before being applied to contrast and sharpness values for the pixels in the given set, as described above in regard to pixel luminance characteristic calculations. Positioning, translating, reshaping, or otherwise altering the contrast weight distribution function and sharpness weight distribution function may depend on the particular set of source-image pixels whose contrast weights and sharpness weights are to be determined. By customizing the contrast weight distribution function and the sharpness weight distribution function to each particular set of mutually-aligned source-image pixels, the contrast and sharpness weights resulting from the application of those distribution functions may be fine-tuned to assure optimal representation of the combined contrast and sharpness information that is stored collectively in the pixels of each particular set of mutually-aligned source-image pixels.

Depending on the embodiment of the automated image-blending mechanism that is incorporated in the image blending module (FIG. 10, element 1025), the method of automated assignment of certain image characteristic weights, such as luminance weights, color saturation weights, contrast weights, and sharpness weights, may be modified for certain sets of mutually-aligned source-image pixels that represent particular regions of a scene being photographed. Such modifications to the method of assigning image characteristic weights may be based on information auxiliary to the image characteristic values of the pixels in those certain pixel sets. The modifications may serve to emphasize or de-emphasize the relative contributions of various pixels in certain sets of mutually-aligned source-image pixels that represent particular regions of a scene being photographed, and the need for such emphasis or de-emphasis may be indicated by image metadata values, such as exposure values, that may be recorded by a camera to provide information auxiliary to data contained in the values of the individual pixels in a source image. For example, exposure values in effect during the capture of a particular source image, and recorded as part of the source image's metadata, may indicate that the whole source image is underexposed. In such instances, pixels in the underexposed source image that represent the lighter regions of the scene being photographed may tend to capture more detailed information, for the lighter regions of the scene, than do corresponding pixels in overexposed images. In fact, the corresponding pixels in overexposed images may "wash out" corresponding regions of the photographed scene. Thus, given a set of mutually-aligned source-image pixels which correspond to a bright region of the scene being photographed, it may be desirable to emphasize the contribution to be made by the pixels in the given set which belong to underexposed images over the contribution to be made by the pixels in the given set which belong to overexposed images. To this end, a bell curve, or other luminance weight distribution function applied to the given set's luminance values may be shifted leftward on a luminance value spectrum to favor the contribution made by pixels in the underexposed images over the contribution made by pixels in the overexposed images. In general, metadata stored for any of the source images may indicate a need to bias the assignment of weights to certain individual pixels in the source images.

Figure 6:
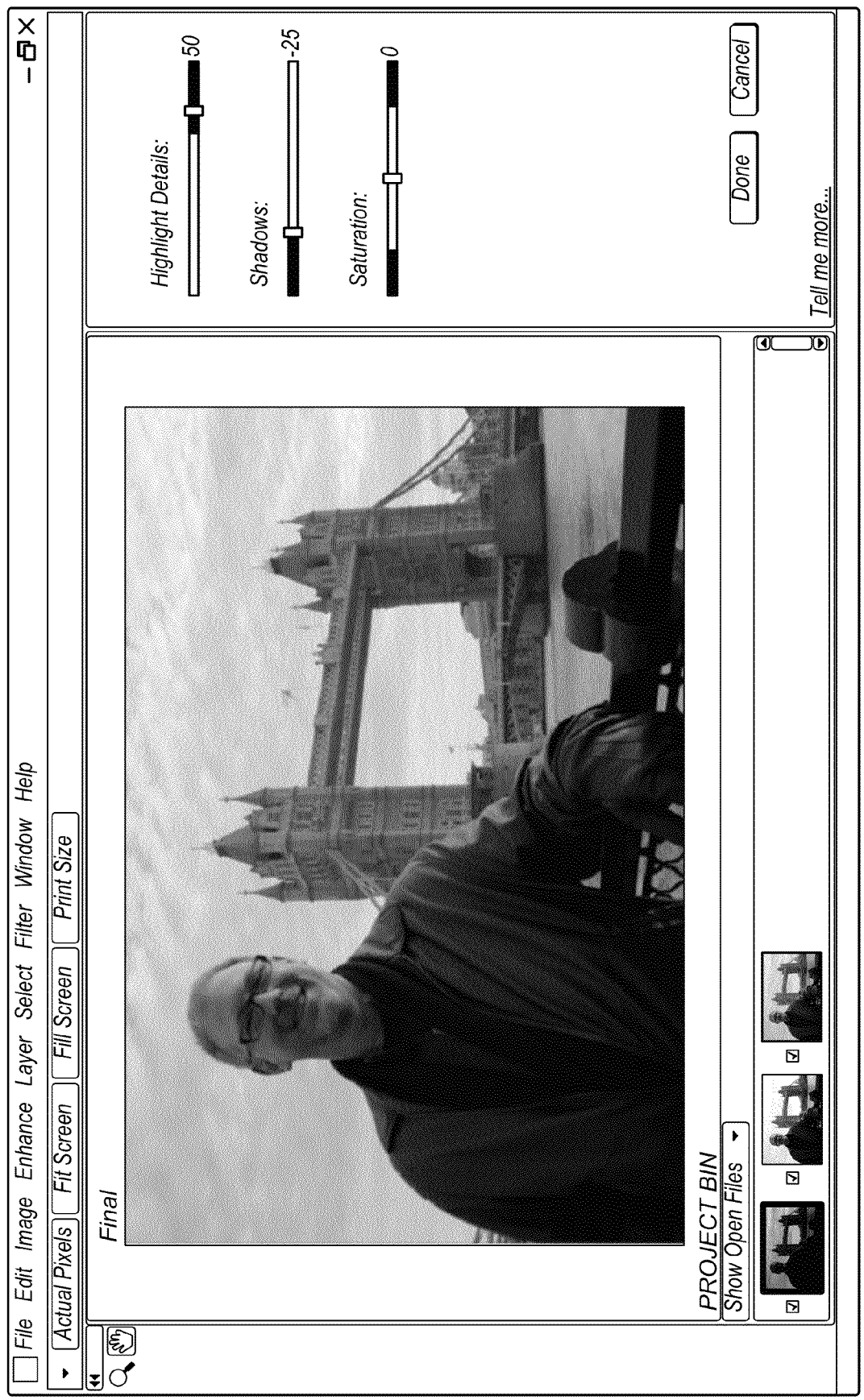
FIGS. 6-8 illustrate one embodiment of a user interface for a system that blends multiple digital input images of the same scene to generate a new digital image of the same scene.
Figure 7:
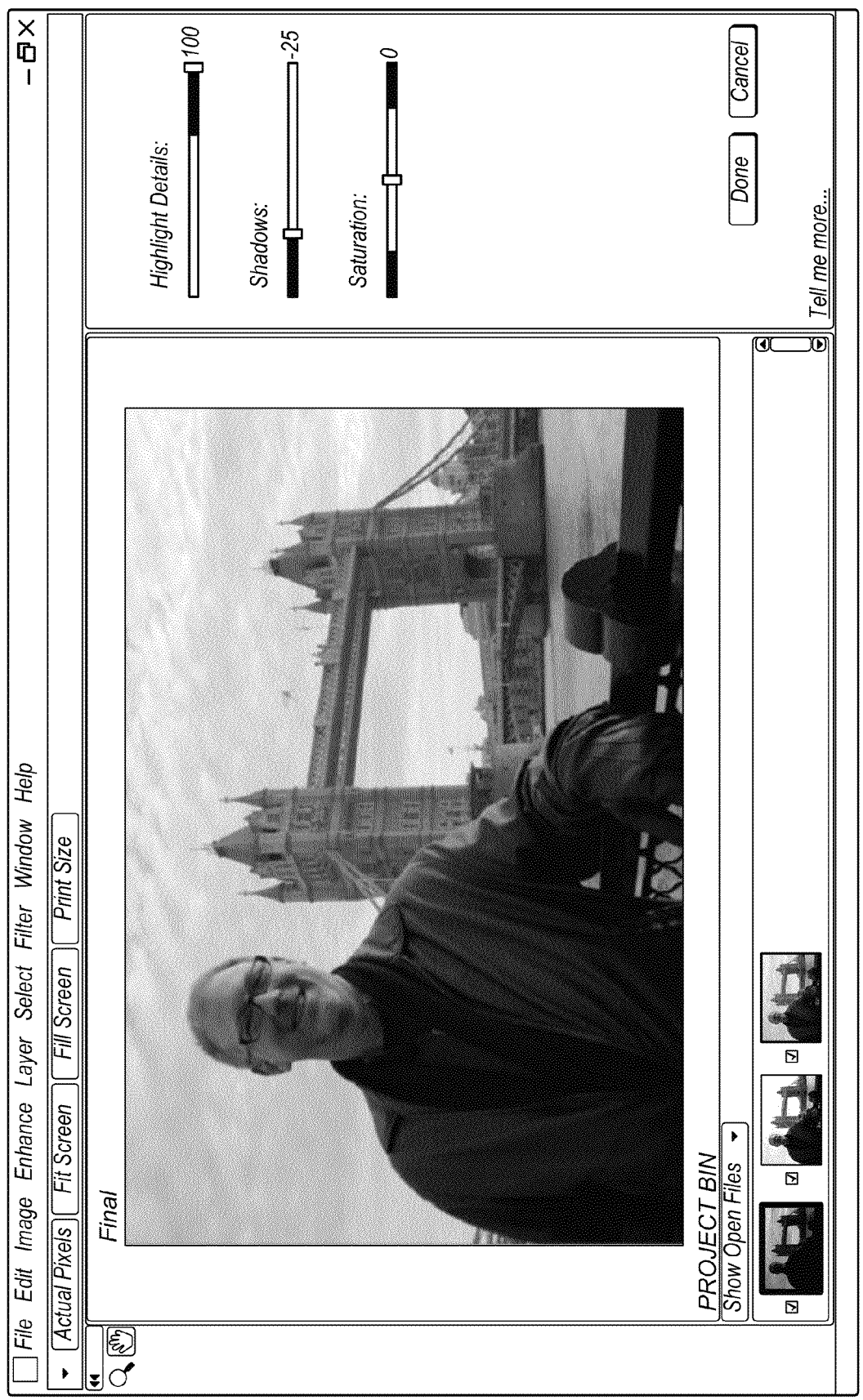
Figure 8:
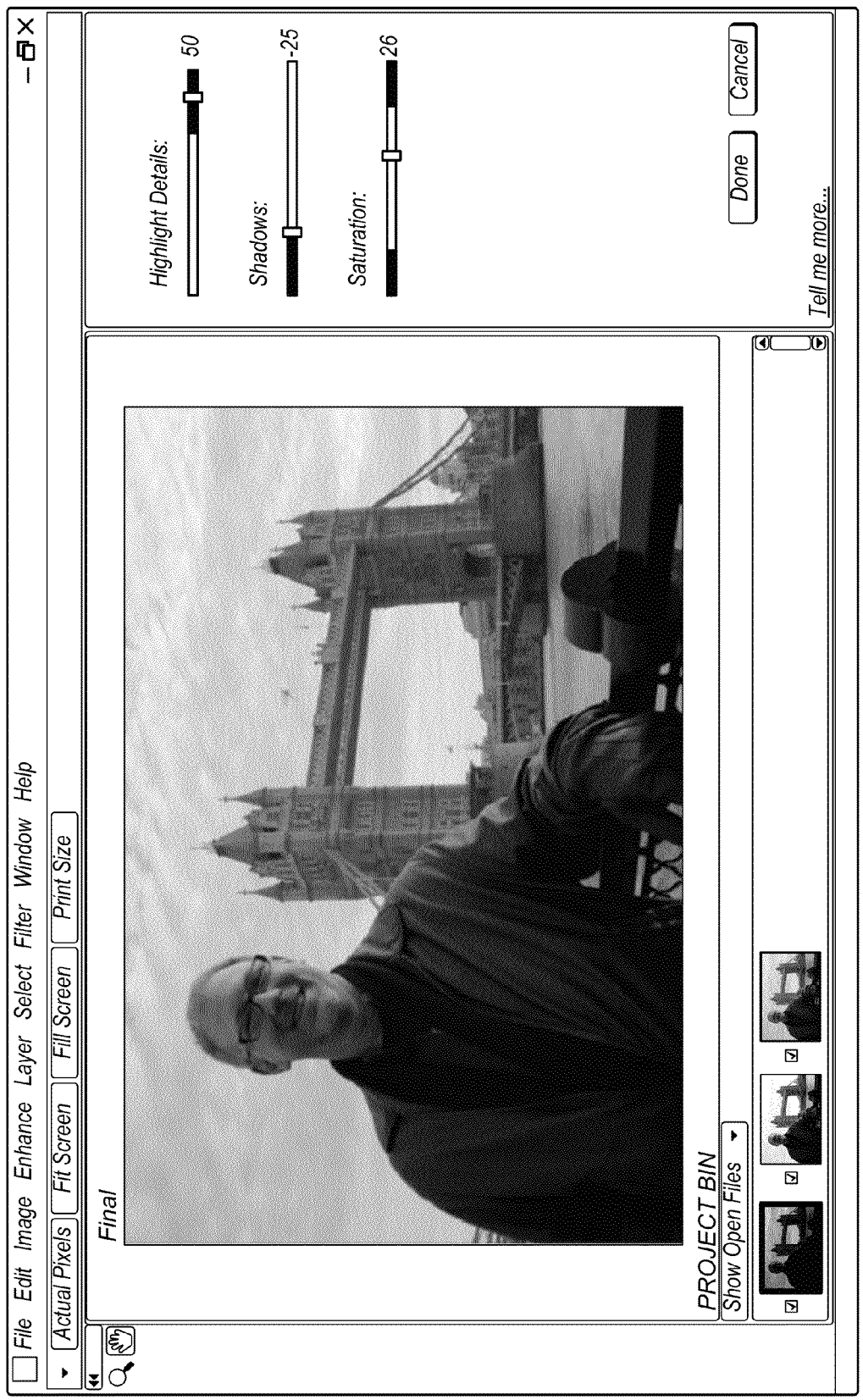

FIGS. 6-8 illustrate one embodiment of a user interface for a system that blends multiple digital input images of the same scene to generate a new digital output image of the same scene. Each instance of the user interface appearing in FIGS. 6-8 displays three thumbnail representations along its bottom edge. In each instance, the thumbnail images represent the three digital input images illustrated in FIGS. 1-3. The representations of the three digital input images may be independently selected and deselected by checking or unchecking corresponding adjacent tick boxes. Whichever images are selected may be automatically blended by image blending module 1025 of FIG. 10 using methods such as the ones described in the foregoing paragraphs. Image blending module 1025 of FIG. 10 may be configured to receive input to select a plurality of the digital input images via the user interface illustrated in FIGS. 6-8, or via any other embodiment of a user interface comprising representations of a plurality of digital input images of the same scene which are independently selectable and de-selectable via the user interface.

According to numerous embodiments, image blending module 1025 may, in response to receiving input to select a plurality of digital input images, automatically generate a new digital image by blending the selected plurality of digital input images (FIG. 4, 404). The blending mechanism of image blending module 1025 may be embodied in various ways, as explained in the preceding paragraphs. For the embodiment illustrated in FIGS. 6-8, image blending module 1025 may receive the input selecting all three thumbnails via the tick boxes adjacent to the thumbnail images in the illustrated user interface. The selected thumbnail images correspond to the three digital input images illustrated in FIGS. 1-3. Upon receiving this selection, image blending module 1025 may automatically generate a new digital output image using methods explained in the foregoing description. The resulting new digital image is a blend of the three selected digital input images. The user interface shown in FIGS. 6-8 may automatically display the newly-generated digital output image as soon as the new digital image has been generated. The embodiment illustrated in FIGS. 6-8 shows a large representation of the blended image above the row of thumbnail images. According to various embodiments, the blended image may be shown in some other convenient location. For example, the resulting blended image may be displayed in a separate window, or may appear in a window for a different interface, or as a desktop background.

According to numerous embodiments, image blending module 1025 may be configured to continuously perform successive iterations of blending of digital input images in response to continued serial modification of an initial selection of several of the digital input images. For example, subsequent to the blending of the three images selected in FIG. 6, and subsequent to the display of the resultant new digital output image, a user may deselect the second thumbnail image. In automatic response to the user's modification of the initial selection of the three digital input images, image blending module 1025 may responsively generate a second new digital output image by blending the currently-selected pair of digital input images. In general, image blending module 1025 may continue to blend successive selections of digital input images as long as successive selections of the digital input images are being received.

In addition to the mechanism for selecting a plurality of thumbnail representations of the three the digital input images illustrated along the lower edge of the user interface in FIGS. 6-8, some embodiments may also provide additional controls that permit a user of the interface to modify the operations of the automated image-blending mechanism that is incorporated in image blending module 1025. The particular embodiment shown in FIGS. 6-8 provides three slider bar controls.

Figure 9:
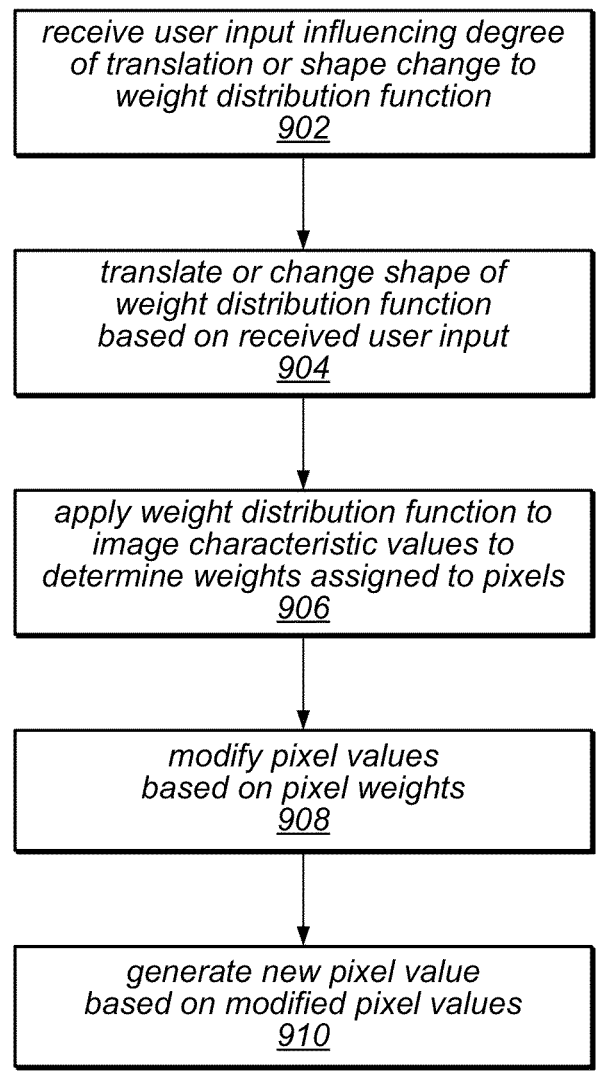
FIG. 9 is a flow diagram illustrating one embodiment of a pixel-by-pixel blending technique in which a user provides input affecting the degree of translation or shape change made to a weight distribution function that is used to generate a new digital image.

The top slider bar control shown in FIGS. 6-8 allows a user to influence the way the automated image-blending mechanism incorporated in image blending module 1025 assigns weights to various mutually-aligned source-image pixels that correspond to the brighter regions of the photographed scene. Since it allows the user to modify operation of the automated image-blending mechanism before the selected digital input images are blended by the automated image-blending mechanism, this "Highlight Details" slider is a preprocessing slider. According to some embodiments, if the "Highlight Details" slider is moved to adjust highlight details, the automated image-blending mechanism incorporated in image blending module 1025 may respond by modifying the method of assigning luminance weights to sets of mutually-aligned source-image pixels that represent particular regions of a scene being photographed. According to some embodiments, movement of the "Highlight Details" slider may alter the weight distribution function that assigns weights to the pixels in the source images before the weight distribution function is applied to pixels representing lighter regions of the photographed scene (FIG. 9, 902). For example, if the "Highlight Details" slider is moved to increase highlight details, then the automated image-blending mechanism incorporated in image blending module 1025 may respond by altering the luminance weight distribution function before it is applied to any set of mutually-aligned source-image pixels that correspond to a bright region of the photographed scene (FIG. 9, 904). Before being applied to a set of mutually-aligned source-image pixels that correspond to a bright region of the photographed scene (FIG. 9, 906), the luminance weight distribution function may be shifted leftward (FIG. 9, 904) on a luminance value spectrum to favor the contribution made by pixels in the set that belong to underexposed images over the contribution made by pixels in the set that belong to overexposed images, that is, to assign larger weights to those pixels in the set which belong to underexposed images, and smaller weights to those pixels in the set which belong to overexposed images (FIG. 9, 906). Such a shift in the luminance weight distribution function relies on the fact that, since all the pixels in the set correspond to the same bright region of the photographed scene, the ones that belong to underexposed source images may capture more detailed information of the scene than the ones that belong to overexposed images, because the pixels in the set that belong to overexposed images may tend "wash out" the corresponding point of the photographed scene.

If the "Highlight Details" slider is moved to decrease highlight details, then the automated image-blending mechanism incorporated in image blending module 1025 may again respond by altering the luminance weight distribution function before it is applied to any set of mutually-aligned source-image pixels that correspond to a bright region of the photographed scene (FIG. 9, 904). In this case, before being applied to a set of mutually-aligned source-image pixels that correspond to a bright region of the photographed scene (FIG. 9, 906), the luminance weight distribution function may be shifted rightward (FIG. 9, 904) on a luminance value spectrum to favor the contribution made by pixels in the set that belong to overexposed images over the contribution made by pixels in the set that belong to underexposed images, that is, to assign larger weights to those pixels in the set which belong to overexposed images, and smaller weights to those pixels in the set which belong to underexposed images (FIG. 9, 906). This naturally has the effect of decreasing highlight details.

Movement of the "Highlight Details" slider may induce other effects, aside from translating the luminance weight distribution function on a luminance value axis. For example, if the slider is moved to increase highlight details, then in addition to being shifted leftward on the luminance value axis, the luminance weight distribution function may also be compressed horizontally (FIG. 9, 902-904) before being applied to pixels within sets of mutually-aligned source-image pixels that correspond to a bright region of the photographed scene. This horizontal compression of the luminance weight distribution function (cf. variance of a Gaussian function) concentrates weighting emphasis on those pixels whose luminance values are nearer a middle of the luminance weight distribution function, which are pixels from underexposed source images. Conversely, if the slider is moved to decrease highlight details, then in addition to being shifted rightward on the luminance value axis, the luminance weight distribution function may also be stretched horizontally (FIG. 9, 902-904) before being applied to pixels within sets of mutually-aligned source-image pixels that correspond to a bright region of the photographed scene.

According to some embodiments, the degree of translation and compression of the luminance weight distribution function may be proportional to the extent of movement of the "Highlight Details" slider, so that a smaller displacement of the slider may produce a lesser degree of translation and compression of the luminance weight distribution function than a larger displacement of the slider.

The degree to which the luminance weight distribution function is shifted or compressed before being applied to a particular set of mutually-aligned source-image pixels may further depend on the relative brightness of the region of the photographed scene to which the particular set of pixels correspond. For example, for a first and a second set of mutually-aligned source-image pixels, such that the first set of pixels correspond to a portion of a bright region of the photographed scene that is lighter than the portion of the bright region to which the second set of pixels correspond, the luminance weight distribution function may be shifted or compressed to a greater extent, before being applied to luminance values of the first set of pixels, than it is shifted or compressed before being applied to luminance values of the second set of pixels. That is, among sets of mutually-aligned source-image pixels that correspond to bright regions of the photographed scene, the degree to which the luminance weight distribution function is shifted or compressed before being applied to one of the sets depends on the luminosity of the point in the photographed scene to which the one set of pixels corresponds. The automated image-blending mechanism incorporated in image blending module 1025 may therefore supply some form of gradient to control the degree of translation and compression applied for sets of mutually-aligned source-image pixels that correspond to a bright region of the photographed scene. This gradient mechanism may assure smooth transitions within bright regions of the new digital output image, and may also mitigate the production of unwanted artifacts along boundaries and edges.

The "Shadows" slider of the user interface illustrated in FIGS. 6-8 may perform a function analogous to the one performed by the "Highlight Details" slider. Just as the "Highlight Details" slider allows a user to favor the contribution of those pixels, within a set of mutually-aligned source-image pixels, which belong to underexposed source images over the pixels which belong to overexposed source images, so the "Shadows" slider allows a user to favor the contribution of those pixels, within a set of mutually-aligned source-image pixels, which belong to overexposed source images over the pixels which belong to underexposed source images.

The middle slider bar control shown in FIGS. 6-8 allows a user to influence the way the automated image-blending mechanism incorporated in image blending module 1025 assigns weights to various mutually-aligned source-image pixels that correspond to the darker regions of the photographed scene. Since it allows the user to modify operation of the automated image-blending mechanism before the selected digital input images are blended by the automated image-blending mechanism, this "Shadows" slider is a pre-processing slider. According to some embodiments, if the "Shadows" slider is moved to adjust shadow details, the automated image-blending mechanism incorporated in image blending module 1025 may respond by modifying the method of assigning luminance weights to sets of mutually-aligned source-image pixels that represent particular regions of a scene being photographed. According to some embodiments, movement of the "Shadows" slider may alter the weight distribution function that assigns weights to the pixels in the source images before the weight distribution function is applied to pixels representing darker regions of the photographed scene (FIG. 9, 902). For example, if the "Shadows" slider is moved to increase shadow details, then the automated image-blending mechanism incorporated in image blending module 1025 may respond by altering the luminance weight distribution function before it is applied to any set of mutually-aligned source-image pixels that correspond to a dark region of the photographed scene (FIG. 9, 904). Before being applied to a set of mutually-aligned source-image pixels that correspond to a dark region of the photographed scene (FIG. 9, 906), the luminance weight distribution function may be shifted rightward (FIG. 9, 904) on a luminance value spectrum to favor the contribution made by pixels in the set that belong to overexposed images over the contribution made by pixels in the set that belong to underexposed images, that is, to assign larger weights to those pixels in the set which belong to overexposed images, and smaller weights to those pixels in the set which belong to underexposed images (FIG. 9, 906). Such a shift in the luminance weight distribution function relies on the fact that, since all the pixels in the set correspond to the same dark region of the photographed scene, the ones that belong to overexposed source images may capture more detailed information of the scene than the ones that belong to underexposed images, because the pixels in the set that belong to underexposed images may tend "black out" the corresponding point of the photographed scene.

If the "Shadows" slider is moved to decrease shadow details, then the automated image-blending mechanism incorporated in image blending module 1025 may again respond by altering the luminance weight distribution function before it is applied to any set of mutually-aligned source-image pixels that correspond to a dark region of the photographed scene (FIG. 9, 904). In this case, before being applied to a set of mutually-aligned source-image pixels that correspond to a dark region of the photographed scene (FIG. 9, 906), the luminance weight distribution function may be shifted leftward (FIG. 9, 904) on a luminance value spectrum to favor the contribution made by pixels in the set that belong to underexposed images over the contribution made by pixels in the set that belong to overexposed images, that is, to assign larger weights to those pixels in the set which belong to underexposed images, and smaller weights to those pixels in the set which belong to overexposed images (FIG. 9, 906). This naturally has the effect of decreasing shadow details.

Movement of the "Shadows" slider may induce other effects, aside from translating the luminance weight distribution function on a luminance value axis. For example, if the slider is moved to increase shadow details, then in addition to being shifted rightward on the luminance value axis, the luminance weight distribution function may also be compressed horizontally (FIG. 9, 902-904) before being applied to pixels within sets of mutually-aligned source-image pixels that correspond to a dark region of the photographed scene. This horizontal compression of the luminance weight distribution function (cf. variance of a Gaussian function) concentrates weighting emphasis on those pixels whose luminance values are nearer a middle of the luminance weight distribution function, which are pixels from overexposed source images. Conversely, if the slider is moved to decrease shadow details, then in addition to being shifted leftward on the luminance value axis, the luminance weight distribution function may also be stretched horizontally (FIG. 9, 902-904) before being applied to pixels within sets of mutually-aligned source-image pixels that correspond to a dark region of the photographed scene.

According to some embodiments, the degree of translation and compression of the luminance weight distribution function may be proportional to the extent of movement of the "Shadows" slider, so that a smaller displacement of the slider may produce a lesser degree of translation and compression of the luminance weight distribution function than a larger displacement of the slider.

The degree to which the luminance weight distribution function is shifted or compressed before being applied to a particular set of mutually-aligned source-image pixels may further depend on the relative blackness of the region of the photographed scene to which the particular set of pixels correspond. For example, for a first and a second set of mutually-aligned source-image pixels, such that the first set of pixels correspond to a portion of a dark region of the photographed scene that is blacker than the portion of the dark region to which the second set of pixels correspond, the luminance weight distribution function may be shifted or compressed to a greater extent, before being applied to luminance values of the first set of pixels, than it is shifted or compressed before being applied to luminance values of the second set of pixels. That is, among sets of mutually-aligned source-image pixels that correspond to dark regions of the photographed scene, the degree to which the luminance weight distribution function is shifted or compressed before being applied to one of the sets depends on the luminosity of the point in the photographed scene to which the that one set of pixels corresponds. The automated image-blending mechanism incorporated in image blending module 1025 may therefore supply some form of gradient to control the degree of translation and compression applied for sets of mutually-aligned source-image pixels that correspond to a dark region of the photographed scene. This gradient mechanism may assure smooth transitions within dark regions of the new digital output image, and may also mitigate the production of unwanted artifacts along boundaries and edges.

The bottom slider bar control shown in FIGS. 6-8 may allow a user to modify the overall color saturation of a new digital image obtained by feeding the digital source images into the automated image-blending mechanism incorporated in image blending module 1025, according to some embodiments. Since the effect of the overall color saturation control is applied after the digital input images are blended by the automated image-blending mechanism to generate the new digital output image, the "Saturation" slider is a postprocessing control. The slider may be moved along its axis to either increase or decrease color saturation for the entire new digital output image.

At some point in time, a user may, according to some embodiments, choose a favorite one of several new digital output images generated by blending various selections of pluralities of the digital input images while the slider bar controls are set to various positions. In such instances, a user may decide to activate a "Done" button like the one shown in FIGS. 6-8 in order to indicate a preferred new digital output image generated by blending a particular set of the digital input images with the slider bar controls set to particular positions. Such indications may be received, according to numerous embodiments, via a great variety of known means for receiving an input signal.

For purposes of speed and efficiency, new output images generated before the user signals a choice of a favorite blended image may have been derived by blending lower-resolution or other representations of the selected original input images that require less computer memory than the original input images themselves. When the user does assert a "Done" signal, or some other similar signal, image blending module 1025 may automatically re-blend the favored selected plurality of the digital input images, while the slider bar controls are set to corresponding favored positions, using full-resolution versions of the original input images in order to generate a corresponding full-resolution new digital output image that possesses the maximum information available through blending of the favored selection of images. This re-blending process may, in some embodiments, occur only when image blending module 1025 receives an input signal to re-blend the selected plurality of the digital input images using full-resolution input images. The resulting new digital output image is a full-resolution blend of the favored combination of digital input images, generated in response to the user's activating the "Done" button shown in FIGS. 6-8.

Figure 10:
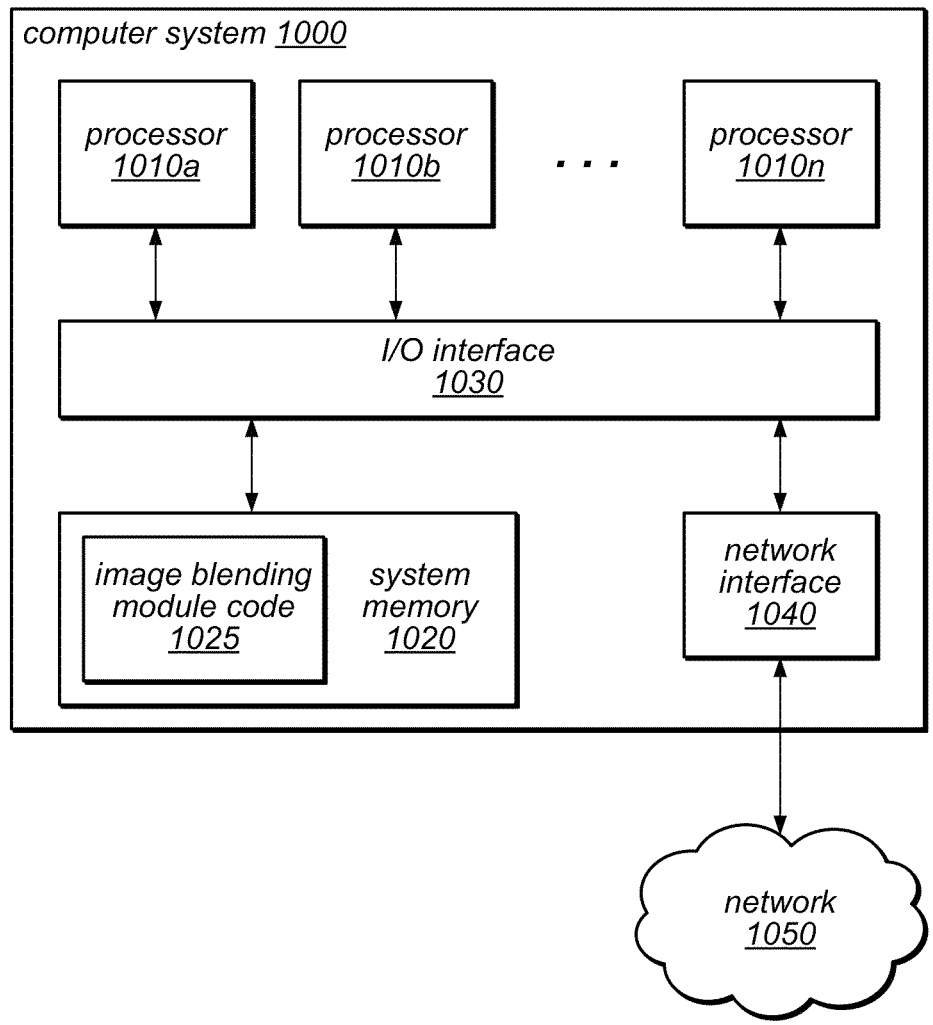
FIG. 10 is a block diagram illustrating an embodiment of a computer system.

FIG. 10 illustrates one embodiment of an architecture that may be configured to implement any or all of the various features of the systems illustrated in FIGS. 1-9. In particular, image blending module 1025 may be configured to perform any or all of the various features of the systems and methods described in the foregoing paragraphs. For example, image blending module 1025 may be configured to receive the plurality of digital input images of the same scene, and to generate new digital images by blending selected ones of the digital input images, as described in the foregoing paragraphs. It is noted that across a range of embodiments, functions of image blending module 1025 may be implemented in hardware, in software, or in a combination of software and hardware.

Generally speaking, computer system 1000 illustrated in FIG. 10 may correspond to any suitable type of computer system configured to execute applications. For example, computer system 1000 may correspond to a desktop computer system, a laptop or notebook or netbook computer, a mainframe computer system, a workstation, a network computer, a handheld computing device such as a personal digital assistant, cellular phone, media player, or combination device, a camera, a set top box, a mobile device, a consumer device, a video game console, a handheld video game device, an application server, a storage device, a peripheral device such as a printer, copy machine, switch, modem, or router, or another type of computing or electronic device. In various embodiments, computer system 1000 may include a microprocessing system, storage capacity, input and output systems, and/or networking capability. Storage capacity may be implemented remotely or locally, and may include internal storage or removable media devices. Internal storage may be implemented, for example, using memory, such as random access memory (RAM), mass storage devices such as hard disks, solid-state drives, disk array controllers, or other suitable means. Removable storage media devices may include, for example, compact disc systems, DVD systems, Blu-ray systems, floppy disk drives, Zip drives, USB flash drives, tape drives, or other types of devices. Input systems may include a keyboard, mouse, trackball, joystick, touchpad, touch screen, graphics table stylus, pointing stick, light pen, directional pad, eye tracking device, gesture signaling device, or similar input device, and may also include an image scanner or web cam for image or video input. Output systems may variously include a video subsystem including a video monitor or other display device, an audio subsystem, or other types of output devices. In some embodiments, computer system 1000 may be configured to execute one or more operating systems, such as Microsoft Windows™, Apple MacOS™, Linux™, or any other suitable operating systems.

Exemplary Computer System

It is contemplated that in some embodiments, any of the methods, techniques or components described above may be implemented as instructions and data capable of being stored or conveyed via a computer-accessible medium. Such methods or techniques may include, for example and without limitation, the various methods for receiving a plurality of digital input images of the same scene, and for generating new digital images by blending selected ones of the digital input images, as described in the foregoing paragraphs. In particular, image blending module 1025 or any partition of its functions may be implemented as such instructions. Such instructions may be executed to perform a particular computational function, such as generating, sending, or receiving a message, to implement mathematical functions such as integration, differentiation, convolution, etc., as well as to implement higher-order functions such as operating system functioning, network communications functioning, application functioning, and/or any other suitable functions.

One exemplary embodiment of a computer system including tangible, computer-accessible storage media is illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. In different embodiments, system 1000 may be variously configured as a desktop computer system, a laptop or notebook or netbook computer, a mainframe computer system, a workstation, a network computer, a handheld computing device such as a personal digital assistant, cellular phone, media player, or combination device, a camera, a set top box, a mobile device, a consumer device, a video game console, a handheld video game device, an application server, a storage device, a peripheral device such as a printer, copy machine, switch, modem, or router, or another type of computing or electronic device.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 1010 may commonly, but not necessarily, implement the same ISA.

System memory 1020 may be configured to store instructions and data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above, are shown stored within system memory 1020 as image blending module code 1025. It is noted that in some embodiments, image blending module code 1025 may include instructions and data implementing desired functions that are not directly executable by processor 1010 but are represented or encoded in an abstract form that is translatable to instructions that are directly executable by processor 1010. For example, image blending module code 1025 may include instructions specified in an ISA that may be emulated by processor 1010, or by other code executable on processor 1010. Alternatively, image blending module code 1025 may include instructions, procedures or statements implemented in an abstract programming language that may be compiled or interpreted in the course of execution. As non-limiting examples, image blending module code 1025 may include code specified in a procedural or object-oriented programming language such as C or C++, a scripting language such as Perl or Ruby or Python, a markup language such as HTML or XML, or any other suitable language.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functioning of I/O interface 1030, such as an interface to system memory 1020, may be incorporated directly into processor 1010.

Network interface 1040 may be configured to allow data to be exchanged between computer system 1000 and other devices attached to a network 1050, such as other computer systems or communications devices, for example. In particular, network interface 1040 may be configured to allow communication between computer system 1000 and various external devices. These external devices may include various computing and communications devices, which may include elements similar to those of computer system 1000. In particular, the external devices may include personal computers, telephony devices or network-attached computing devices that users may employ to access network services. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a tangible, computer-accessible storage medium configured to store instructions and data as described above. However, in other embodiments, instructions and/or data may be stored upon and retrieved from different types of computer-accessible storage media. Generally speaking, a computer-accessible medium may include storage media or memory media such as magnetic or optical media, e.g., disk or CD/DVD-ROM coupled to computer system 1000 via I/O interface 1030. A computer-accessible medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. A computer-accessible medium may generally be accessible via transmission media or signals such as electrical, electromagnetic, or digital signals, which may be conveyed via a communication medium such as a network and/or a wireless link, such as may be accessed via network interface 1040.

It is noted that the various methods illustrated in the figures and described above represent exemplary embodiments of methods. These methods may be implemented in software, hardware or any suitable combination thereof. Where suitable, the order of operation of method elements is not restricted to the order described or shown, and in other embodiments various method elements may be performed in a different order. It is also contemplated that in various embodiments, not all method elements need be performed, and existing method elements may be modified or additional elements added.

Although the embodiments above have been described in considerable detail, numerous variations and modifications will become apparent to those skilled in the art once the above disclosure is fully appreciated. It is intended that the following claims be interpreted to embrace all such variations and modifications. Accordingly, the above description is to be regarded in an illustrative rather than a restrictive sense.

What is claimed is:

1. A method, comprising:
   receiving a plurality of digital input images of a same scene, wherein the digital input images comprise corresponding pixel arrays; and
   for each set of corresponding pixels from the corresponding pixel arrays:
      assigning a weight to each pixel in the set of corresponding pixels via a weight distribution function, comprising:
         analyzing values of an image characteristic for the pixels in the set of corresponding pixels to determine a relationship among the values of the image characteristic;
         altering the weight distribution function based on the determined relationship, wherein said altering comprises translating the weight distribution function based on a difference between a median of the values of the image characteristic for the pixels in the set of corresponding pixels and a mean of the values of the image characteristic for the pixels in the set of corresponding pixels; and
         applying the altered weight distribution function to the value of the image characteristic for each pixel in the set of corresponding pixels to determine the weight assigned to the pixel; and
      deriving a new pixel value for a new pixel in a new digital image based on modifying the pixel value for each pixel in the set of corresponding pixels depending on the weight assigned to the pixel.

2. The method of claim 1, wherein the image characteristic is pixel luminance, color saturation, contrast, or sharpness.

3. The method of claim 1, wherein the weight distribution function comprises a probability density function or a piecewise linear function.

4. The method of claim 1, wherein said translating shifts the weight distribution function in a direction from the mean toward the median, based on the difference between the median and the mean, and further based on a comparison of the number of pixels in the set of corresponding pixels whose characteristic value is on the median side of the mean with the number of pixels in the set of corresponding pixels whose characteristic value is on the non-median side of the mean.

5. The method of claim 1, wherein the image characteristic is color saturation, and wherein the weight assigned to each pixel is different from zero.

6. The method of claim 1, wherein the modifying the pixel value further depends on another weight assigned to each pixel in the set of corresponding pixels, wherein the other weight is based on another image characteristic for the pixels in the set of corresponding pixels.

7. The method of claim 1, wherein the modifying the pixel value comprises, for each pixel in the set of corresponding pixels, computing a product of the pixel value for the pixel with the weight assigned to the pixel, and said deriving the new pixel value is based on subsequently summing the computed products.

8. The method of claim 1, wherein said altering further comprises:
   translating the weight distribution function along an axis or changing a shape of the weight distribution function;
   receiving user input to control an extent of the translating or the changing the shape; and
   performing the translating or the changing the shape based on the received user input.

9. A system, comprising:
   a processor; and
   a memory coupled to the processor, wherein the memory stores program instructions executable by the processor to implement an image blending module configured to perform:
      receiving a plurality of digital input images of a same scene, wherein the digital input images comprise corresponding pixel arrays; and
      for each set of corresponding pixels from the corresponding pixel arrays, assigning a weight to each pixel in the set of corresponding pixels via a weight distribution function, comprising:

determining values of an image characteristic for the pixels in the set of corresponding pixels;

altering the weight distribution function by translating the weight distribution function based on a difference between a median of the values of the image characteristic for the pixels in the set of corresponding pixels and a mean of the values of the image characteristic for the pixels in the set of corresponding pixels;

applying the altered weight distribution function to the value of the image characteristic for each pixel in the set of corresponding pixels to determine the weight assigned to the pixel; and deriving a new pixel value for a new pixel in a new digital image based on modifying the pixel value for each pixel in the set of corresponding pixels depending on the weight assigned to the pixel;

wherein for several of the sets of corresponding pixels, the weight distribution function is altered before said applying.

10. The system of claim 9, wherein, for each individual set of the several sets of corresponding pixels, the weight distribution function is altered before said applying, based on a relationship among the values of the image characteristic for the pixels in the individual set of corresponding pixels.

11. The system of claim 9, wherein said translating shifts the weight distribution function in a direction from the mean toward the median, based on the difference between the median and the mean, and further based on a comparison of the number of pixels in the set of corresponding pixels whose characteristic value is on the median side of the mean with the number of pixels in the set of corresponding pixels whose characteristic value is on the non-median side of the mean.

12. The system of claim 9, wherein the image characteristic is pixel luminance, color saturation, contrast, or sharpness, and wherein the weight distribution function comprises a probability density function or a piecewise linear function.

13. The system of claim 9, wherein the modifying the pixel value further depends on another weight assigned to each pixel in the set of corresponding pixels, wherein the other weight is based on another image characteristic for the pixels in the set of corresponding pixels.

14. The system of claim 9, wherein the modifying the pixel value comprises, for each pixel in the set of corresponding pixels, computing a product of the pixel value for the pixel with the weight assigned to the pixel, and said deriving the new pixel value is based on subsequently summing the computed products.

15. A non-transitory computer-readable storage medium storing program instructions, wherein the program instructions are computer-executable to perform:

receiving a plurality of digital input images of a same scene, wherein the digital input images comprise corresponding pixel arrays; and for each set of corresponding pixels from the corresponding pixel arrays, assigning a weight to each pixel in the set of corresponding pixels via a weight distribution function, comprising:

determining values of an image characteristic for the pixels in the set of corresponding pixels;

altering the weight distribution function by translating the weight distribution function based on a difference between a median of the values of the image characteristic for the pixels in the set of corresponding pixels and a mean of the values of the image characteristic for the pixels in the set of corresponding pixels;

applying the altered weight distribution function to the value of the image characteristic for each pixel in the set of corresponding pixels to determine the weight assigned to the pixel; and deriving a new pixel value for a new pixel in a new digital image based on modifying the pixel value for each pixel in the set of corresponding pixels depending on the weight assigned to the pixel;

wherein for several of the sets of corresponding pixels, the weight distribution function is altered before said applying.

16. The non-transitory computer-readable storage medium of claim 15, wherein, for each individual set of the several sets of corresponding pixels, the weight distribution function is altered before said applying, based on a relationship among the values of the image characteristic for the pixels in the individual set of corresponding pixels.

17. The non-transitory computer-readable storage medium of claim 15, wherein said translating shifts the weight distribution function in a direction from the mean toward the median, based on the difference between the median and the mean, and further based on a comparison of the number of pixels in the set of corresponding pixels whose characteristic value is on the median side of the mean with the number of pixels in the set of corresponding pixels whose characteristic value is on the non-median side of the mean.

18. The non-transitory computer-readable storage medium of claim 15, wherein the image characteristic is color saturation, and wherein the weight assigned to each pixel is different from zero.

19. The non-transitory computer-readable storage medium of claim 15, wherein the modifying the pixel value:

further depends on another weight assigned to each pixel in the set of corresponding pixels, wherein the other weight is based on another image characteristic for the pixels in the set of corresponding pixels; and comprises, for each pixel in the set of corresponding pixels, computing a product of the pixel value for the pixel with the weight assigned to the pixel, and said deriving the new pixel value is based on subsequently summing the computed products.

\* \* \* \* \*